(12) United States Patent
Wanat

(10) Patent No.: US 6,986,475 B2
(45) Date of Patent: Jan. 17, 2006

(54) COVER FOR FOOD PROCESSOR

(75) Inventor: David J. Wanat, Merdien, CT (US)

(73) Assignee: Conair Corporation, Stamford, CT (US)

( * ) Notice: Subject to any disclaimer, the term of this patent is extended or adjusted under 35 U.S.C. 154(b) by 120 days.

(21) Appl. No.: 10/458,774

(22) Filed: Jun. 10, 2003

(65) Prior Publication Data

US 2004/0251342 A1 Dec. 16, 2004

(51) Int. Cl.
*B02C 25/00* (2006.01)

(52) U.S. Cl. .................. 241/37.5; 241/282.1; 241/301

(58) Field of Classification Search ............... 241/37.5, 241/36, 92, 282.1, 282.2, 285.1, 301
See application file for complete search history.

(56) References Cited

U.S. PATENT DOCUMENTS

| | | | |
|---|---|---|---|
| 4,111,372 A | 9/1978 | Hicks et al. | |
| 4,216,917 A * | 8/1980 | Clare et al. | ................. 241/37.5 |
| 4,506,836 A | 3/1985 | Williams | |
| 4,512,522 A | 4/1985 | Williams | |
| 4,629,131 A | 12/1986 | Podell | |
| 4,819,882 A | 4/1989 | Stottmann et al. | |
| 4,824,029 A | 4/1989 | Stottmann et al. | |
| 5,037,033 A | 8/1991 | Stottmann et al. | |
| 6,186,425 B1 | 2/2001 | Mattos | |
| 6,397,735 B1 | 6/2002 | Wong | |
| 6,669,124 B2 * | 12/2003 | Lazzer et al. | .................. 241/36 |

* cited by examiner

*Primary Examiner*—Mark Rosenbaum
(74) *Attorney, Agent, or Firm*—Lawrence Cruz; Steven A. Garner

(57) ABSTRACT

A cover assembly for a food processor having a cover cooperative with a working bowl or container, an accessory being selectively cooperative with at least one cavity in the cover, a safety system including a disengaging assembly cooperative with the cover and/or the accessory to selectively deactivate or disengage the safety system. The cover and the accessory can be simultaneously separated and/or removed from the food processor or adjusted relative to each other and/or the food processor.

20 Claims, 2 Drawing Sheets

COVER FOR FOOD PROCESSOR

BACKGROUND OF THE INVENTION

1. Field of the Invention

The present invention relates to food processors. More particularly, the invention relates to food processors having a safety interlock system activated via a feed cavity.

2. Description of the Prior Art

Food processors providing a variety of different types of food preparations including, for example, mixing, chopping, grinding, pureeing, or liquefying are well known. Typically, these food processors have a cover for keeping the food that is to be prepared and for protecting against inadvertent mishaps during the preparation process. These covers typically have a cavity in the form of a hollow feed chute or tube for receiving a substance into the cover that is to be processed. An accessory is typically required to cooperate with the cavity to advance the food via a plunging or pushing action. Conventionally, these food processors also have a safety system controlling the operation of the food processor such that it is operative only when the safety feature is satisfied. See for example, U.S. Pat. Nos. 6,397,735; 6,186,425; 5,037,033; 4,824,029; 4,819,882; 4,629,131; 4,512,522; 4,506,836; 4,216,917; and 4,111,372.

Food processors do not typically include a safety mechanism related to the feed cavity. The few food processors that do have such a mechanism do not also have an assembly for selectively disengaging the safety mechanism while an accessory is continually engaged with the feed cavity. Thus, such food processors stop operating only when the accessory has been fully disengaged from the feed cavity. Consequently, the flexibility of use associated with such a food processor is somewhat limited. Accordingly, it is desirable to provide a cover for a food processor that has a disengaging assembly for allowing greater flexibility in use.

SUMMARY OF THE INVENTION

It is an object of the present invention to provide a cover for use with a food processor that provides the food processor with greater flexibility in use.

It is another object of the present invention to provide a food processor having a safety system selectively activated by via a feed cavity.

It is still another object of the present invention to provide a cover with a disengaging assembly for selectively disengaging a safety system.

It is a further object of the present invention to provide a cover with one or more accessories for cooperating with the feed cavity.

It is still a further object of the present invention to provide a cover with an accessory that can be selectively positioned in relation to the feed cavity to facilitate a variety of different operations.

These and other objects and advantages of the present invention are achieved by a cover assembly for a food processor having a cover that cooperates with a container or working bowl, which in turn cooperates with an operating and/or control base. The cover has at least one cavity therein. The cover assembly also has an accessory for cooperating with the at least one cavity, a safety system for cooperating with the accessory and/or the at least one cavity, and a disengaging assembly for cooperating with the safety system and/or the accessory or the at least one cavity. The disengaging assembly selectively deactivates or disengages the safety system such that the cover and accessory can be simultaneously separated and removed from the food processor or adjusted relative to each other and/or the food processor.

BRIEF DESCRIPTION OF THE DRAWINGS

Other and further objects, advantages and features of the present invention will be understood by reference to the following specification in conjunction with the accompanying drawings, in which like reference characters denote like elements of structure.

DETAILED DESCRIPTION OF THE INVENTION

Figure 1:
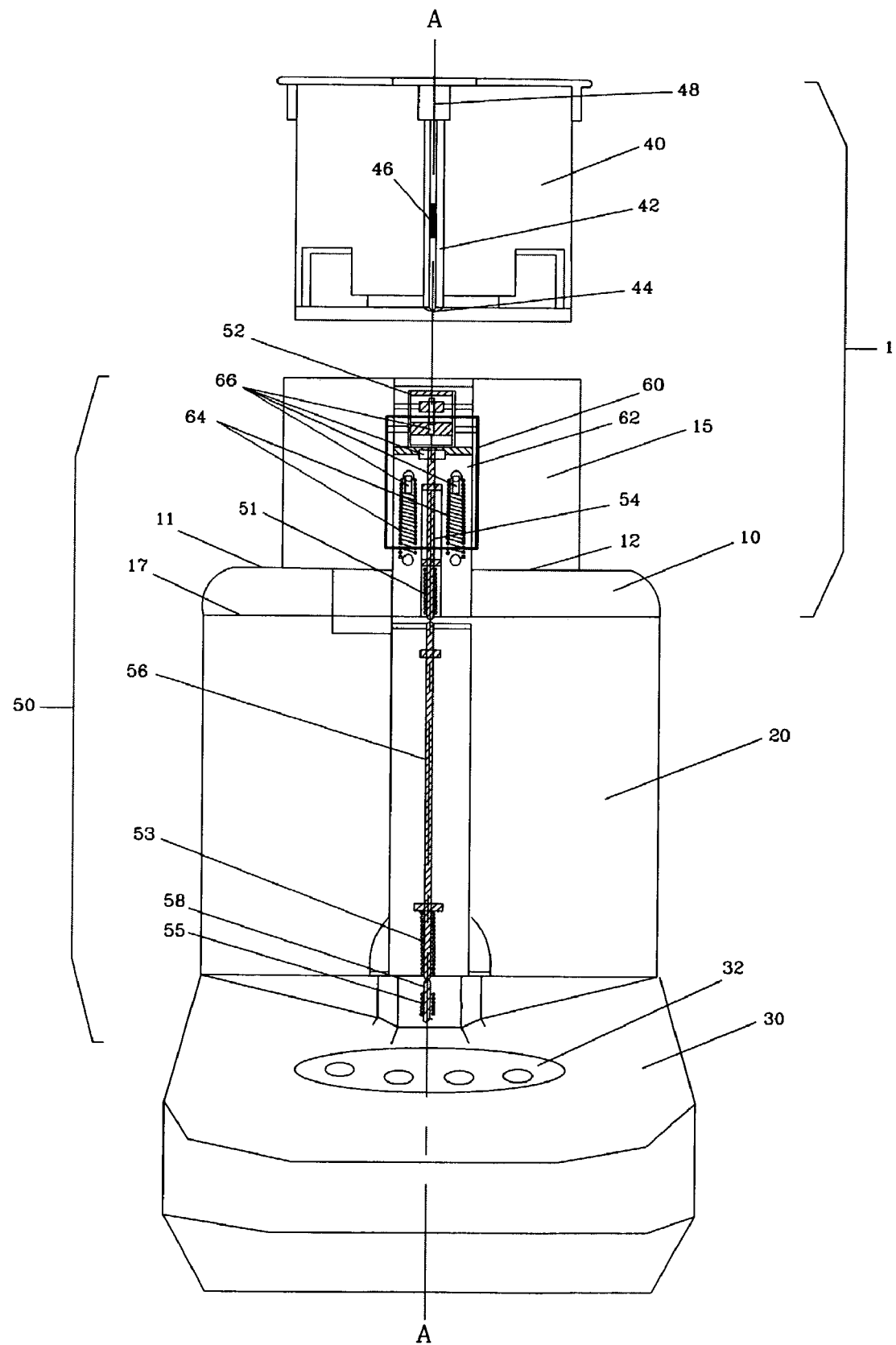
FIG. 1 is a front view of a cover for a food processor in accordance with an illustrative embodiment of the present invention.

Referring to the drawings and in particular to FIG. 1, there is shown an illustrative embodiment of an improved cover assembly for a food processor generally represented by reference numeral assembly 1. The cover assembly 1 essentially has a cover 10 for cooperating with a container 20, which in turn cooperates with a control and/or operational base 30, the cover 10 has at least one cavity 15. The cover assembly 1 also has an accessory 40 for cooperating with the at least one cavity 15, a safety system 50 for cooperating with the accessory 40 and/or the at least one cavity 15, and a disengaging assembly 60 for cooperating with the safety system 50. The disengaging assembly 60 selectively deactivates the safety system 50 to thereby conveniently allow the cover 10 and accessory 40 to be simultaneously removed and/or adjusted.

Cover 10 preferably cooperates with container 20. Cover 10 can preferably be separably connected with container 20 in any of a variety of ways. For example, cover 10 and container 20 can be threadably engaged and threadably disengaged, or cover 10 can be removably mounted to container 20 via one or more connectors 22 shown in FIG. 2. Further, it is noted that cover 10 can have any of a variety of forms, shapes, sizes or configurations suitable for cooperating with one or more different food processors.

Figure 2:
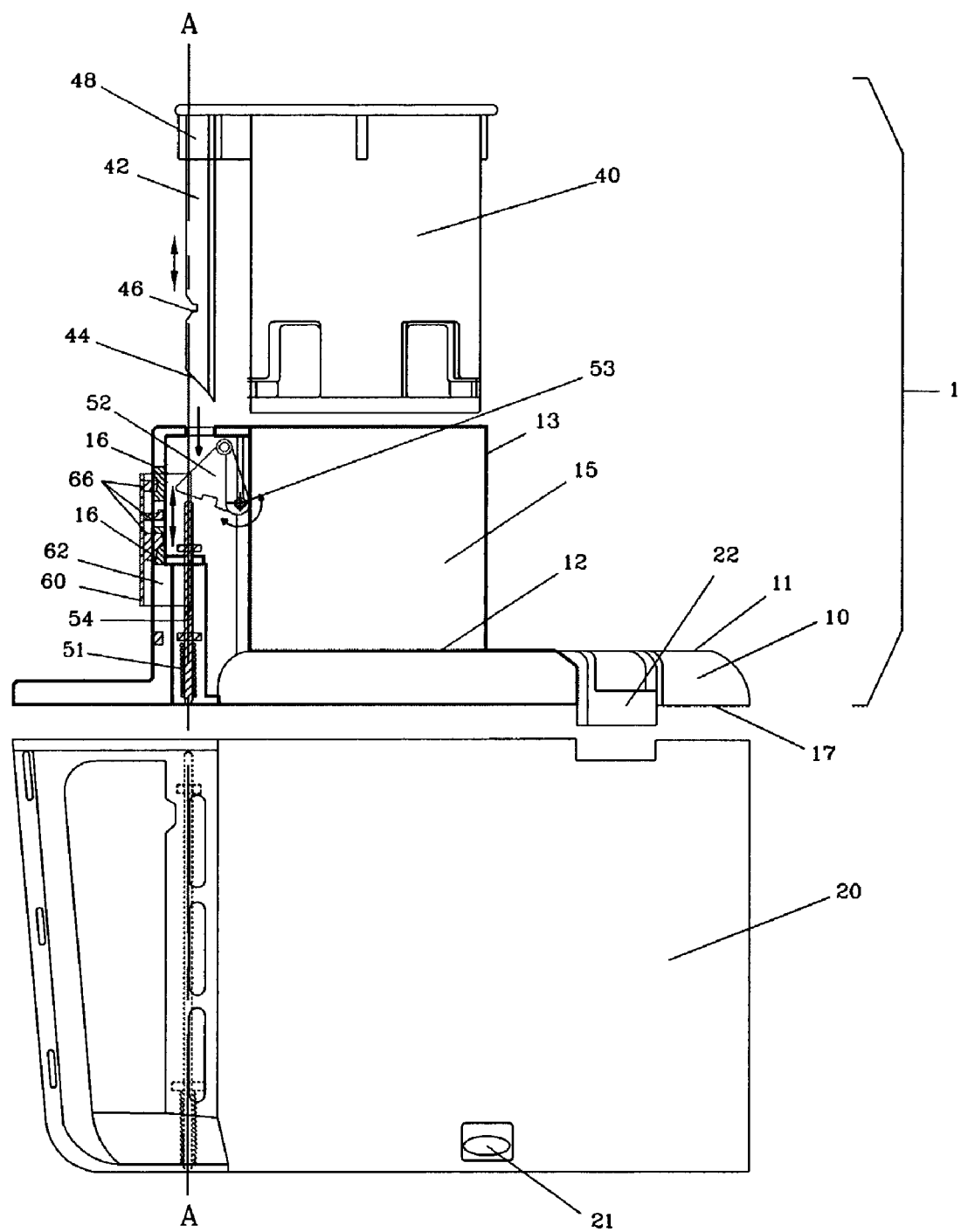
FIG. 2 is an exploded side view of the cover of FIG. 1.

Referring to FIGS. 1 and 2, container 20 is preferably of sufficient size to accommodate a wide variety of different types of matter or substances in a variety of shapes, sizes or forms. Container 20 can have a handle 24. Container 20 preferable cooperates with a control and/or an operational base 30 of the food processor such that the processing of various substances can be performed therein. Preferably, control/operational base 30 houses a motor (not shown) controlled or manipulated by a control panel 32 and/or safety system 50. Container 20 can preferably also accommodate one or more removable blades (not shown) of various shapes, sizes or configurations. The blades preferably cooperate with the motor through container 20. Similar to cover 10, container 20 can also have any of a variety of forms, shapes, or configurations suitable for cooperating with one or more different food processors and accomplishing a variety of different processing operations.

Cavity 15 is preferably formed in an upper wall 12 of cover 10. Cavity 15 is preferably of sufficient size to accommodate the processing of a wide array of different types of substances. Further, cavity 15 can be of various different sizes, shapes or configurations suitable for accomplishing a variety of different preliminary preparations to a substance prior to any processing via the food processor.

Preferably, cavity 15 can also cooperate with an accessory 40 to provide even further flexibility in the use and/or application of the food processor.

Accessory 40 can preferably have any of a variety of different shapes, sizes or configurations suitable for complimenting or facilitating a variety of different preliminary processing operations or preparations. Accessory 40 preferably has an actuator 42 for cooperating with one or more actuators 52, 54, 56, 58 of safety system 50 (discussed in more detail hereafter) to satisfy or activate the safety system such that the food processor is ready for use and may be operated. Also, accessory 40 can cooperate with cavity 15 via a hollow tube or chute 13 extending from cover 10 either from an upper outer surface 11 of cover 10 or from an inner lower surface 17 of cover 10. Accessory 40 and/or cavity 15 can be adjustable. For example, cavity 15, when in the form of chute 13, can be raised and/or lowered telescopically. Cavity 15 can also be enlarged and/or collapsed in diametrically in size. Also, cavity 15 can be similarly adjusted via accessory 40. Thus, either accessory 40, cavity 15 or both, can be selectively positioned or adjusted to facilitate a variety of different operations. Actuator 42 of accessory 40 can preferably have any of a variety of different shapes, sizes or configurations suitable for cooperating with one or more actuators 52, 54, 56, 58, associated with safety system 50 to satisfy or activate the safety system such that the food processor is ready for use and may be operated.

Safety system 50 preferably has one or more actuators, such as for example, a pivot actuator 52, a first rod actuator 54, a second rod actuator 56, and/or a third rod actuator 58 suitable for cooperating with actuator 42 of accessory 40, disengaging assembly 60, either directly or indirectly with a switch (not shown) connected with control panel 32 and/or the motor, such that the food processor preferably operates responsively to an actuation of actuators 52, 54, 56, 58 and the switch.

Preferably, cover 10 has at least one pivot actuator 52 and at least one first rod actuator 54, container 20 has at least one second rod actuator 56, and base 30 has at least one third actuator 58. It is noted that other configurations/arrangements may also be used. By way of illustration, at least one pivot actuator 52 can be a pivoting cam that is rotatable about a pivot point 53, and at least one first rod actuator 54 can be slidable along an axis A, the at least one first rod actuator 54 having a predefined bias accomplished, for example, by a spring 51.

Referring to FIG. 2, preferably actuator 42 of accessory 40 selectively interacts with at least one pivot actuator 52, via a cam face 44 thereon, to cause the at least one pivot actuator 52 to in turn interact with the at least one first rod actuator 54 to overcome the predefined bias thereof and cause the first rod actuator 54 to in turn interact with at least one second rod actuator 56 and/or at least one third rod actuator 58. Preferably, at least one second rod actuator 56 is a rod as shown in FIG. 2, being slidable along axis A and having a predefined bias accomplished, for example, by a spring 53. Preferably, at least one second rod actuator 56 can either directly cooperate with the switch connected with control panel 32 and/or the motor or indirectly cooperate with such switch via, for example, at least one third rod actuator 58 as shown in FIG. 2 having a predefined bias accomplished, for example by a spring 55.

Thus, the food processor will remain inoperative until accessory 40 engages cavity 15 of cover 10 thereby preventing entry of a hand or an undesirable foreign object through the cover 10 into the container 20. Once accessory 40 is properly engaged with cavity 15, safety system 50 is satisfied and the food processor can be operated. Ordinarily, when accessory 40 is removed and/or separated from cavity 15, safety system 50 is disengaged or deactivated and the food processor becomes inoperative once again.

Disengaging assembly 60 preferably allows and/or facilitates deactivating or disengaging the safety system while accessory 40 remains engaged with cavity 15. Thus, cover 10 and accessory 40 can be simultaneously removed or separated from container 20. In addition, cover 10 and accessory 40 can be adjusted with respect to each other and/or to the container 20. Disengaging assembly 60 preferably has a controller or switch 62 and biasing means, such as for example, springs 64 as shown in FIG. 1. Preferably, switch 62 has one or more first engaging elements 66 for cooperating with one or more second engaging elements 16, 46 of cover 10 and/or accessory 40, such that switch 62 can disengage or deactivate safety system 50 preferably by restoring the predefined bias of one or more of the actuators of the safety system or by inhibiting the effect of any one or more of actuators 52, 54, 56, or 58.

Having described some of the preferred features of an illustrative embodiment of the present invention, the process or method for deactivating the food processor preferably includes the following steps: First, providing a food processor with disengaging assembly that is preferably integral with the cover of the food processor. The cover of the food processor preferably having at least one cavity for receiving matter for processing therethrough and into a working bowl or container of the food processor and for cooperating with one or more accessories, such as for example a plunger. Next, the safety system of the food processor is satisfied such that the food processor may be activated/operated. At any subsequent time, the safety system is deactivated via the disengaging assembly such that the food processor becomes inoperable and the cover and the accessory can be selectively and/or individually manipulated or simultaneously separated and/or removed therefrom.

By employing the present invention, it is an advantage that cover 10 and accessory 40 can be safely manipulated either individually or simultaneously to more conveniently accommodate a variety of different operations. Thus, the possible manipulation of cover 10 and/or accessory 40 enables the food processor to be utilized for additional food preparation procedures beyond the many procedures already available with this versatile equipment.

Another advantage of the illustrative embodiment of the present invention is that disengaging assembly 60 can easily be incorporated into existing food processors by replacing the cover and the accessory of such food processors with those of the present invention. Accordingly, cover 10 and accessory 40 can be sold as replacement components to persons who already own conventional food processors. It is to be noted that the accessory 40 preferably can have a stop 48 as illustrated in FIG. 2, to facilitate the proper engagement between the accessory and the cover. When accessory 40 has been fully inserted stop 48 seats down upon cover 10 so as to later serve as or provide a handle or grasping tool for conveniently removing/separating or manipulating the accessory with respect to the cover.

The present invention having been thus described with particular reference to the preferred forms thereof, it will be obvious that various changes and modifications may be made therein without departing from the spirit and scope of the present invention as defined herein. In addition, it is believed that the many advantages of this invention and the manner in which it fulfills the stated objectives will be understood by those skilled in the art.

What is claimed is:

1. A cover assembly for a food processor, comprising:
a cover for cooperating with a container, said container cooperating with a base, said cover having at least one cavity;
an accessory operatively engagable with said cover;
a safety system; and
a disengaging assembly cooperative with said accessory and/or said safety system to selectively deactivate said safety system.

2. The cover assembly of claim 1, wherein said accessory has an actuator.

3. The cover assembly of claim 2, wherein said safety system has one or more intermediate actuators.

4. The cover assembly of claim 3, wherein said actuator of said accessory cooperates with said one or more intermediate actuators of said safety system to activate or satisfy said safety system such that said food processor is ready for use and may be operated.

5. The cover assembly of claim 1, wherein said disengaging assembly has a controller suitable for deactivating said safety system and allowing both said cover and said accessory to be simultaneously removed.

6. The cover assembly of claim 5, wherein said controller is a slide switch having one or more first engaging elements for interacting with one or more second engaging elements of said cover and/or said accessory.

7. The cover assembly of claim 5, wherein said cover and said accessory can be adjusted relative to each other and/or said container.

8. A cover assembly, comprising:
a cover being engagable with a container and having one or more cavities;
one or more accessories being engagable with said one or more cavities;
a safety system being operative in connection with said cover; and
a disengaging switch being operative in connection with said cover, said safety system and said one or more accessories.

9. The cover assembly of claim 8, wherein said cover has one or more actuators.

10. The cover assembly of claim 9, wherein said cover is engagable with one or more actuators of said container.

11. The cover assembly of claim 10, wherein said one or more actuators of said cover are cooperative with said one or more actuators of said container to selectively activate or satisfy said safety system so that said food processor is ready for use and may be operated.

12. The cover assembly of claim 8, wherein said disengaging switch deactivates said safety system and allows said cover and said one or more accessories to be simultaneously removed.

13. The cover assembly of claim 8, wherein said disengaging switch is a slide switch having one or more first engaging elements cooperative with one or more second engaging elements in said cover and/or with said one or more accessories to facilitate deactivating said safety system.

14. A method for deactivating a food processor comprising the steps of:
providing a disengaging assembly operative in connection with a cover for a food processor, wherein said disengaging assembly selectively deactivates a safety system of said food processor, said food processor being operable only when said safety system is satisfied;
deactivating said safety system via said disengaging assembly so that said cover can be selectively manipulated and/or separated relative to said food processor.

15. The method of claim 14, wherein said cover is cooperative with a container and has a cavity for receiving matter to be processed through said cover into said container.

16. The method of claim 14, further comprising the step of providing one or more accessories for cooperating with said cavity to facilitate the passing of said matter to be processed through said cover into said container.

17. The method of claim 16, wherein said one or more accessories activate said safety system such that, when said one or more accessories interact with said cavity to close said opening, said safety system can be satisfied.

18. The method of claim 16, wherein said disengaging assembly has a controller suitable for deactivating said safety system and for allowing said cover and said one or more accessories to be simultaneously removed.

19. The method of claim 18, wherein said controller is a slide switch having one or more first engaging elements cooperative with one or more second engaging elements in said cover and/or said one or more accessories to facilitate deactivating said safety system.

20. The method of claim 14, wherein said cover has one or more actuators for cooperating with one or more actuators of said safety system to activate or satisfy said safety system so that the food processor is ready to be operated.

* * * * *